(12) United States Patent
Rothe

(10) Patent No.: US 11,764,600 B2
(45) Date of Patent: Sep. 19, 2023

(54) RECHARGEABLE BATTERY ASSEMBLY WITH IMPROVED BALANCING

(71) Applicant: Bayerische Motoren Werke Aktiengesellschaft, Munich (DE)

(72) Inventor: Steffen Rothe, Dresden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 294 days.

(21) Appl. No.: 16/748,013

(22) Filed: Jan. 21, 2020

(65) Prior Publication Data

US 2020/0161891 A1 May 21, 2020

Related U.S. Application Data

(63) Continuation of application No. PCT/EP2018/070370, filed on Jul. 27, 2018.

(30) Foreign Application Priority Data

Aug. 23, 2017 (DE) ...................... 10 2017 214 699.0

(51) Int. Cl.
*H02J 7/00* (2006.01)
*H02J 7/04* (2006.01)
(Continued)

(52) U.S. Cl.
CPC ................. *H02J 7/04* (2013.01); *B60L 53/10* (2019.02); *H01M 10/441* (2013.01); *H02J 7/0016* (2013.01)

(58) Field of Classification Search
CPC ........... H02J 7/04; H02J 7/0016; Y02T 90/14; Y02T 10/70; Y02T 10/7072; Y02E 60/10;
(Continued)

(56) References Cited

U.S. PATENT DOCUMENTS 5,773,159 A * 6/1998 Beard .................. H02J 7/0016
429/50
5,774,347 A * 6/1998 Nakanishi ............... G05F 1/565
363/81
(Continued)

FOREIGN PATENT DOCUMENTS

| CN | 103430373 A | 12/2013 |
| CN | 108604816 A | 9/2018 |
| DE | 10 2016 207 555 A1 | 11/2017 |

OTHER PUBLICATIONS

International Search Report (PCT/ISA/210) issued in PCT Application No. PCT/EP2018/070370 dated Oct. 18, 2018 with English translation (four (4) pages).
(Continued)

*Primary Examiner* — Richard Isla
*Assistant Examiner* — Johali A Torres Ruiz
(74) *Attorney, Agent, or Firm* — Crowell & Moring LLP

(57) ABSTRACT

A rechargeable battery assembly has a first battery unit with a first terminal and a second terminal; a second battery unit which is serially connected to the first battery unit and which has a first terminal and a second terminal; and a differential amplifier with an inverting input, a non-inverting input, and an output at which an amplified difference between the signal at the inverting input and the signal at the non-inverting input is produced. The non-inverting input of the differential amplifier is connected to the second terminal of the first battery unit and to the first terminal of the second battery unit. The inverting input of the differential amplifier is coupled to the first terminal of the first battery unit and to the second terminal of the second battery unit. The output of the differential amplifier is connected to the second terminal of the second battery unit. A coupling element with two load connections is connected between the output of the differential amplifier and the second terminal of the second
(Continued)

battery unit. The coupling element allows the second battery unit to be charged via the coupling element but at most allows a minimal discharge of the second battery unit in the direction of the output of the differential amplifier.

6 Claims, 6 Drawing Sheets

(51) Int. Cl.
  *B60L 53/10* (2019.01)
  *H01M 10/44* (2006.01)
(58) Field of Classification Search
  CPC ........... H01M 2220/20; H01M 10/425; H01M 10/441; B60L 53/10; B60L 50/66
  See application file for complete search history.

(56) References Cited

U.S. PATENT DOCUMENTS

| | | | | |
|---|---|---|---|---|
| 2005/0077875 | A1* | 4/2005 | Bohley | H02J 7/0016 320/119 |
| 2005/0269989 | A1* | 12/2005 | Geren | H02J 7/0016 320/119 |
| 2006/0194102 | A1 | 8/2006 | Keshishian et al. | |
| 2014/0035360 | A1* | 2/2014 | Butzmann | H01M 10/425 307/10.1 |
| 2017/0166078 | A1* | 6/2017 | Elie | B60L 58/22 |
| 2019/0058335 | A1 | 2/2019 | Rothe | |

OTHER PUBLICATIONS

German-language Written Opinion (PCT/ISA/237) issued in PCT Application No. PCT/EP2018/070370 dated Oct. 18, 2018 (six (6) pages).

German-language Search Report issued in counterpart German Application No. 10 2017 214 699.0 dated Jul. 26, 2018 with partial English translation (12 pages).

Chinese-language Office Action issued in Chinese Application No. 201880041861.0 dated Jan. 9, 2023 with English translation (20 pages).

\* cited by examiner

RECHARGEABLE BATTERY ASSEMBLY WITH IMPROVED BALANCING

CROSS REFERENCE TO RELATED APPLICATIONS

This application is a continuation of PCT International Application No. PCT/EP2018/070370, filed Jul. 27, 2018, which claims priority under 35 U.S.C. § 119 from German Patent Application No. 10 2017 214 699.0, filed Aug. 23, 2017, the entire disclosures of which are herein expressly incorporated by reference.

BACKGROUND AND SUMMARY OF THE INVENTION

The present invention relates to a rechargeable battery assembly, to an electric drive comprising an electric machine connected to such a rechargeable battery assembly, and to a motor vehicle comprising such an electric drive.

In the case of a rechargeable battery assembly containing various rechargeable battery units, in order to make the voltage that is able to be delivered as uniform as possible and to achieve the best possible performance as a result, so-called voltage balancing circuits (often also referred to as battery cell balancing circuits) have been developed. In this regard, by way of example, US 2005/0269989 A1 describes a circuit of this type, which matches the rechargeable battery units to be balanced—which can also comprise a plurality of rechargeable battery cells—to a parallel-connected voltage divider (reference) by way of a voltage follower circuit. Furthermore, this circuit was connected up in accordance with US 2014/0035360 A1 such that it also became scalable in any desired way.

DE 10 2016 207 555 A1 describes a rechargeable battery assembly wherein a different cell voltage coupled in series is utilized as a reference. In this case, the factor of the cell voltage of the "predecessor cell" is −1, and the factor of the "successor" is 2. In this case, the rechargeable battery units to be balanced are influenced by charging and discharging. In the case of discharging, energy from the cells or rechargeable battery units is converted into heat and thus as it were wasted. This adversely affects the energy efficiency.

The present invention is based on the object of providing a rechargeable battery assembly in which the abovementioned problem of the adversely affected energy efficiency is eliminated.

According to the invention, a rechargeable battery assembly comprises: a first rechargeable battery unit having a first terminal and a second terminal; a second rechargeable battery unit having a first terminal and a second terminal, said second rechargeable battery unit being connected in series with the first rechargeable battery unit; and a differential amplifier having an inverting input, a non-inverting input and an output, at which an amplified difference between the signal at the inverting input and the signal at the non-inverting input is present. The non-inverting input of the differential amplifier is connected to the second terminal of the first rechargeable battery unit and to the first terminal of the second rechargeable battery unit. The inverting input of the differential amplifier is coupled to the first terminal of the first rechargeable battery unit and to the second terminal of the second rechargeable battery unit, and the output of the differential amplifier is connected to the second terminal of the second rechargeable battery unit. According to the present invention, provision is furthermore made for a coupling element having two load terminals to be connected between the output of the differential amplifier and the second terminal of the second rechargeable battery unit, which coupling element enables the second rechargeable battery unit to be charged via the coupling element, but permits at most slight discharging of the second rechargeable battery unit in the direction of the output of the differential amplifier. The coupling element provided according to the invention thus prevents the second rechargeable battery unit from being discharged to an excessively great extent, or it completely prevents such discharging, while at the same time the charging of the second rechargeable battery unit is possible without being hindered. As a result, an unnecessary conversion of stored energy into heat is avoided and the energy efficiency is increased. The discharging of the rechargeable battery unit having the highest pole voltages is effected only partly or not at all by way of the discharge by means of the differential amplifier. Additional discharging affects each rechargeable battery unit if the latter is incorporated in scaled balancing circuits as voltage supply. This affords the advantage that the respective voltage balancing circuit operates in a charging fashion to an increased degree and in a discharging fashion to a lesser degree if at all—and thus in an energy-optimized fashion.

The term rechargeable battery unit should in each case be understood to mean that one rechargeable battery cell or a plurality of rechargeable battery cells (also simply referred to just as "cell") are integrated to form one unit.

The differential amplifier can be formed from an operational amplifier for example in a simple manner.

In accordance with one advantageous configuration of the invention, the coupling element is a diode (having two load terminals). It should be noted here that the operational amplifier or differential amplifier is interconnected such that the threshold voltage of the diode characteristic curve and the forward resistance of the diode are approximately through to completely compensated for. In this case, the differential amplifier is interconnected such that the differential amplifier makes available at its output a voltage composed of the cell voltage in the charged state and the threshold voltage of the diode used. The forward resistance of the diode can likewise be approximately compensated for by the resistors used for the voltage divider.

Alternatively, in a further advantageous configuration of the invention, it is possible to use a transistor (likewise having two load terminals) as the coupling element. By way of corresponding driving of this transistor, by way of example, discharging of the second rechargeable battery unit can then be permitted to the small extent desired—or alternatively prevented completely. The explanations given in association with the interconnection of the differential amplifier with the diode connected downstream are analogously applicable when a transistor is used.

In accordance with one advantageous embodiment of the invention, the differential amplifier is interconnected such that it is configured as a voltage balancing unit by way of a non-inverting amplifier. In this case, the inverting input of the differential amplifier is connected to the negative pole of the voltage supply, while the non-inverting input of the differential amplifier is connected to the positive pole of the voltage supply.

Alternatively, the differential amplifier can be interconnected such that it is configured as a voltage balancing unit by way of an inverting amplifier. In this case, the inverting input of the differential amplifier is connected to the positive pole of the voltage supply and the non-inverting input of the differential amplifier is connected to the negative pole of the voltage supply.

A further configuration possibility consists in the differential amplifier being interconnected such that it is configured as a voltage follower circuit for the voltage balancing. In this case, the inverting input of the differential amplifier and the output thereof are connected to the first terminal of the first rechargeable battery unit and to the second terminal of the second rechargeable battery unit, while the non-inverting input of the differential amplifier is connected via a voltage divider circuit between the two poles of the voltage supply.

One advantageous configuration of the invention consists in providing a plurality of differential amplifiers for a corresponding number of additional rechargeable battery units—with corresponding interconnection—, which are arranged in a cascaded manner. It is thus possible to balance energy stores with many rechargeable battery units with regard to the respective voltage that is output.

In accordance with a further advantageous development of the invention, a further, third rechargeable battery unit having a first terminal and a second terminal can be provided, wherein the second terminal of said third rechargeable battery unit and the supply terminal of the differential amplifier are connected to a second pole of the voltage supply, while the first terminal of the first rechargeable battery unit and the supply terminal of the differential amplifier are connected to a first pole of the voltage supply. This makes it possible for a "next but one" rechargeable battery unit or cell also to be able to be used as reference or voltage supply.

The object mentioned in the introduction is additionally achieved by way of an electric drive comprising an electric machine, and a motor vehicle comprising such an electric drive. Accordingly, advantages identical or similar to those in connection with the description above are also afforded, for which reason, in order to avoid repetition, reference is made to the above explanations in association with the device according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
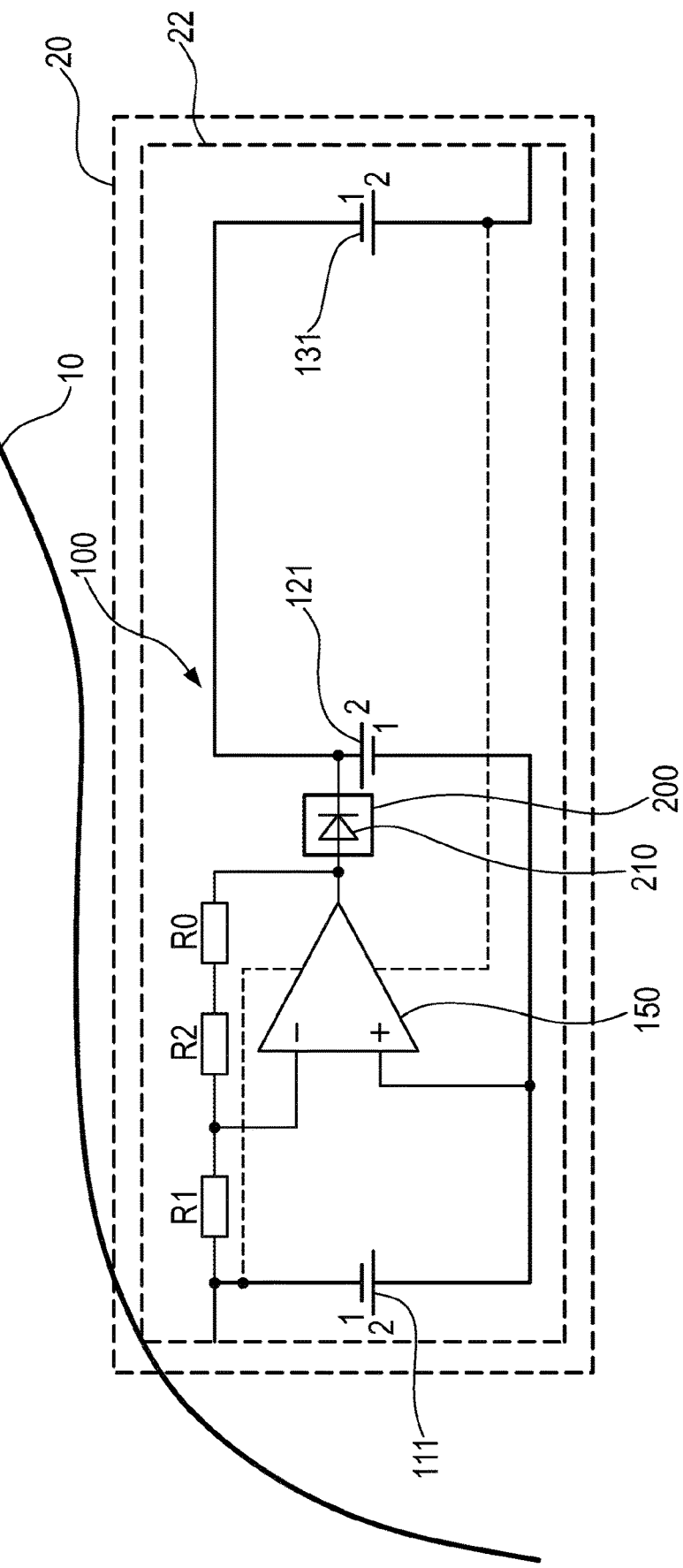
FIG. 1 shows a first embodiment of the rechargeable battery assembly according to the invention comprising a differential amplifier interconnected as a voltage balancing unit by way of a non-inverting amplifier.

FIG. 1 illustrates a first embodiment of a rechargeable battery assembly 100 as may be in a vehicle 10 shown only in partial outline. A first rechargeable battery unit 111 and a second rechargeable battery unit 121 and also a third rechargeable battery unit 131 are connected in series. A differential amplifier 150 embodied as an operational amplifier is provided, the output of which is coupled to a second pole of the second rechargeable battery unit 121, here the positive pole. A non-inverting input of the differential amplifier 150 is connected to the positive pole of the first rechargeable battery unit 111. An inverting input of the differential amplifier 150 is connected via a first resistor R1 to the first pole of the first rechargeable battery unit 111, here the negative pole. The inverting input of the differential amplifier 150 is connected via a second resistor R2 and a resistor R0 to the output of the differential amplifier 150 and to the positive pole of the second rechargeable battery unit 121. In the case of this first embodiment, the differential amplifier 150, on account of its interconnection, operates as a voltage amplifier having a gain factor of 2.

According to the invention, a coupling element 200, embodied here as a "simple" diode 210, is connected between the output of the differential amplifier 150—downstream of the junction point of the feedback loop—and the second pole of the second rechargeable battery unit 121. The diode 210 prevents the discharging of the second rechargeable battery unit 121 for the balancing of the entire rechargeable battery assembly 100, while on the other hand the diode enables the second rechargeable battery unit 121 to be charged for the purposes of balancing. As a result, a higher energy efficiency is achieved since no energy contained in the second rechargeable battery unit 121 is converted into heat and thus lost as a result of discharging. It should moreover be mentioned that some other diode, such as a Zener diode, for example, can also be used instead of the "simple" diode 210 mentioned above. It should be noted here that the differential amplifier 150 is interconnected such that the threshold voltage of the diode characteristic curve and the forward resistance of the diode are approximately through to completely compensated for. The design of R0 in the circuits can be implemented such that the differential amplifier provides at the output a voltage composed of the voltage of the rechargeable battery unit in the charged state and the threshold voltage of the diode used. The forward resistance of the diode can likewise be approximately compensated for by R1 and R2.

As illustrated in FIG. 1, the first pole of the first rechargeable battery unit 111 and the second pole of the third rechargeable battery unit 131 serve as voltage supply or reference for the differential amplifier 150. Alternatively, it is also possible for the second pole of the second rechargeable battery unit 121 to be used for this purpose, rather than the second pole of the third rechargeable battery unit 131.

It goes without saying that, in this embodiment, the first rechargeable battery unit 111 can be formed from a single rechargeable battery cell or a plurality of rechargeable battery cells connected in series one after another.

Figure 2:
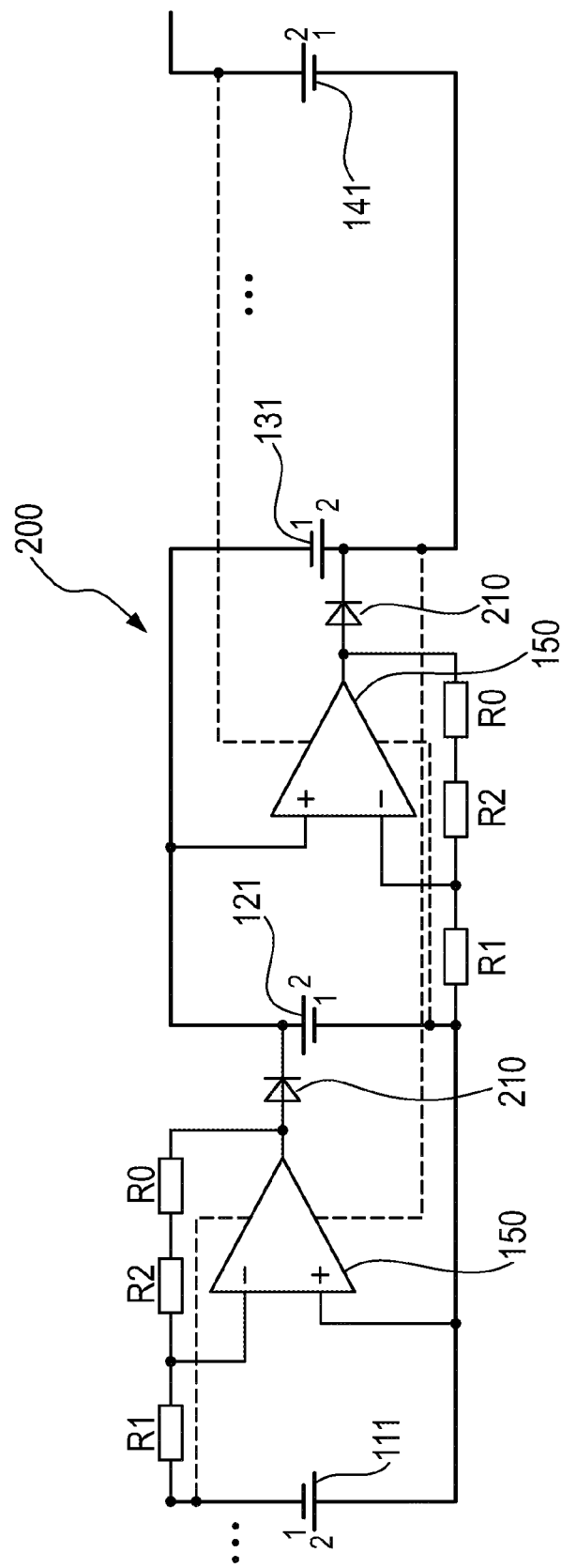
FIG. 2 shows a second embodiment of the rechargeable battery assembly according to the invention comprising a plurality of series-connected rechargeable battery units and differential amplifiers connected in a cascaded manner, which are interconnected in each case as a voltage balancing unit by way of a non-inverting amplifier.

Furthermore, a string of series-connected rechargeable battery units 111, 121, 131, 141 and/or rechargeable battery groups can be completely balanced if all the rechargeable battery units of the string are connected in a manner as illustrated in the cascaded arrangement in FIG. 2, which illustrates a second embodiment of the rechargeable battery assembly 200 according to the invention. The explanations given in association with the first embodiment are also applicable to this second embodiment and to the further embodiments, provided that no explanation to the contrary is given or provided that this is not precluded per se.

Figure 3:
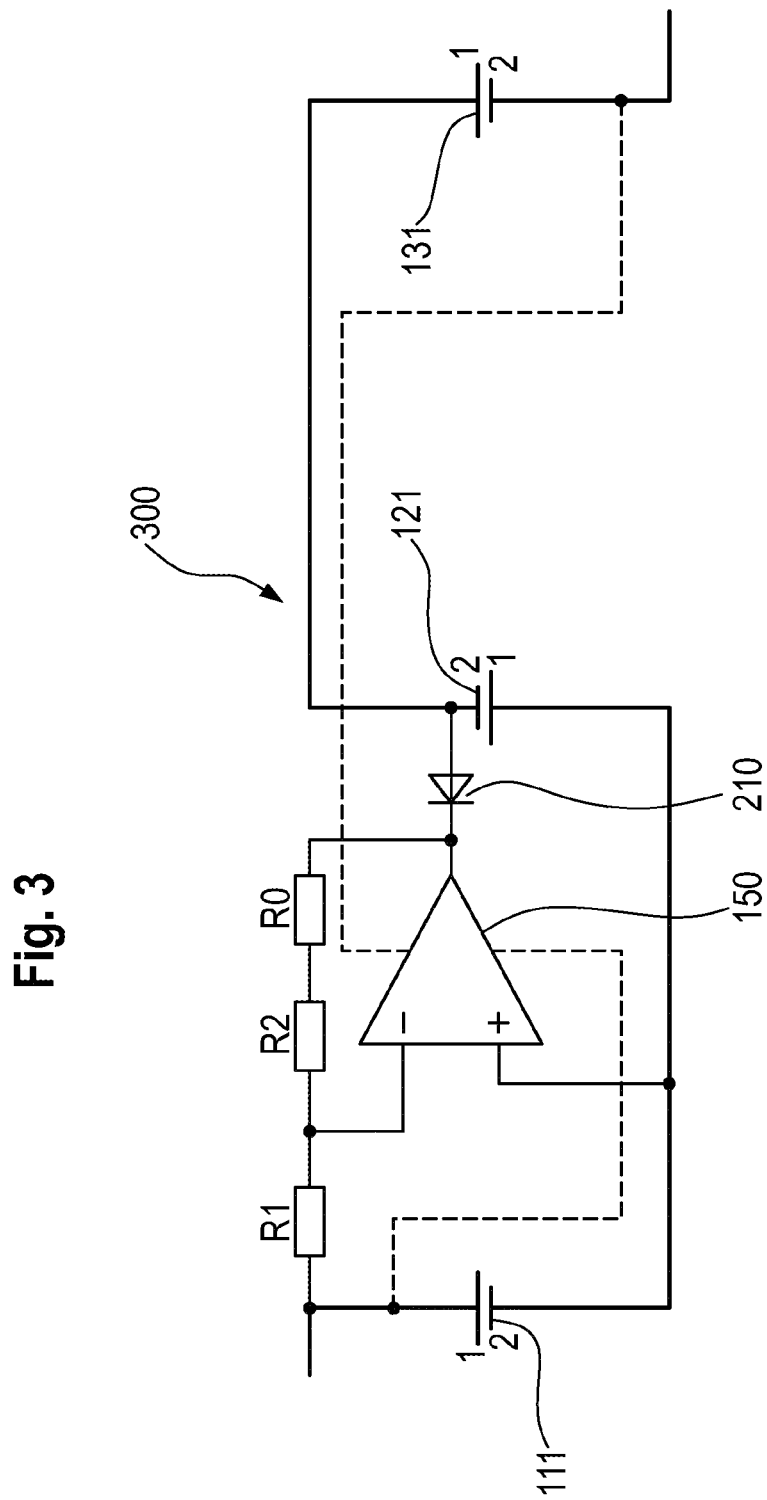
FIG. 3 shows a third embodiment of the rechargeable battery assembly according to the invention comprising a differential amplifier interconnected as a voltage balancing unit by way of an inverting amplifier.

FIG. 3 shows a third embodiment of the rechargeable battery assembly 300 according to the invention, which is substantially complementary to the first embodiment. A first rechargeable battery unit 111 and a second rechargeable battery unit 121 are connected in series. The output of the differential amplifier 150 is connected to the second, negative pole of the second rechargeable battery unit 121. The non-inverting input of the differential amplifier 150 is connected to the negative pole of the first rechargeable battery unit 111, and the inverting input of the differential amplifier 150 is coupled via a first resistor R1 to a first, positive pole of the first rechargeable battery unit 111. Moreover, the inverting input of the differential amplifier 150 is coupled via a second resistor R2 and a resistor R0 to the output of the differential amplifier 150 and to the negative pole of the second rechargeable battery unit 121.

With opposite polarity relative to the first embodiment, here a diode 210 is connected between the output of the differential amplifier 150 and the second terminal of the second rechargeable battery unit 121. As a result, the diode 210 can fulfil the same function as in the first embodiment.

In this third embodiment, the differential amplifier 150, on account of its interconnection, has a gain of −1. The value of the first resistor R1 and the value of the second resistor R2 are identical in this embodiment.

What is achieved by means of the differential amplifier 150 and the interconnection thereof is that the same potential is present at the terminals of the first rechargeable battery unit 111 and of the second rechargeable battery unit 121. The first rechargeable battery unit 111 and the second rechargeable battery unit 121 are thus balanced with respect to one another. As already mentioned, what is achieved as a result of the balancing is that a higher proportion of the charge in the rechargeable battery units 111, 121 is available for current consumers connected thereto.

Figure 4:
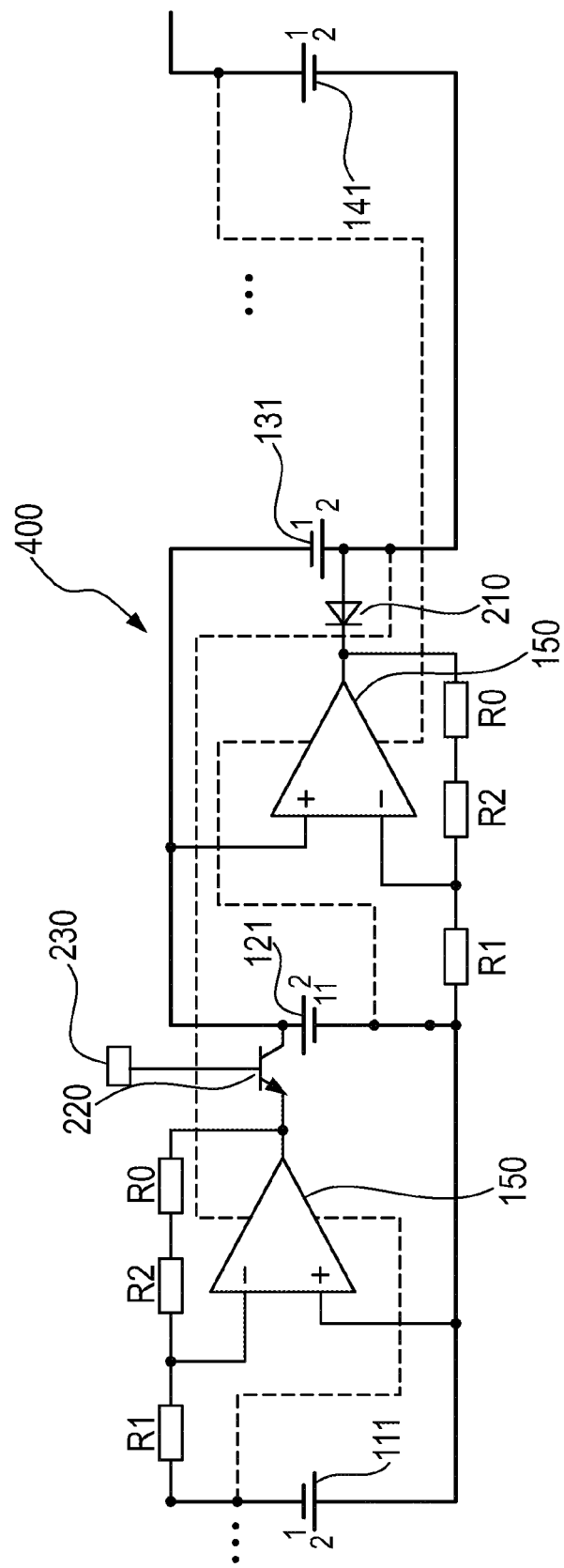
FIG. 4 shows a fourth embodiment of the rechargeable battery assembly according to the invention comprising a plurality of series-connected rechargeable battery units and differential amplifiers connected in a cascaded manner, which are interconnected in each case as a voltage balancing unit by way of an inverting amplifier.

In a manner similar to that in the case of the second embodiment shown in FIG. 2, it is also possible in the case of a fourth embodiment of the rechargeable battery assembly 400, as illustrated in FIG. 4, to arrange a plurality of differential amplifiers 150 in a cascaded manner in order to balance more than only two or three rechargeable battery units 111, 121, 131. As an alternative to the use of the diode 210 used in the first three embodiments, a transistor 220 is illustrated by way of example in this fourth embodiment. Given appropriate interconnection and driving of this transistor 220 by a driving device 230, which is merely illustrated schematically, the transistor 220 can perform the same function as the diode 210. Furthermore, it is possible to drive the transistor 220 such that it affords a possibility of discharging the second rechargeable battery unit 121 (or any other rechargeable battery unit to which said transistor is assigned). By means of suitable control, in this case the extent of the discharge of the relevant rechargeable battery unit can be restricted to a desired maximum limit. It goes without saying that in all the other embodiments, too, such transistors 220 can be used instead of the diodes 210 illustrated.

Figure 5:
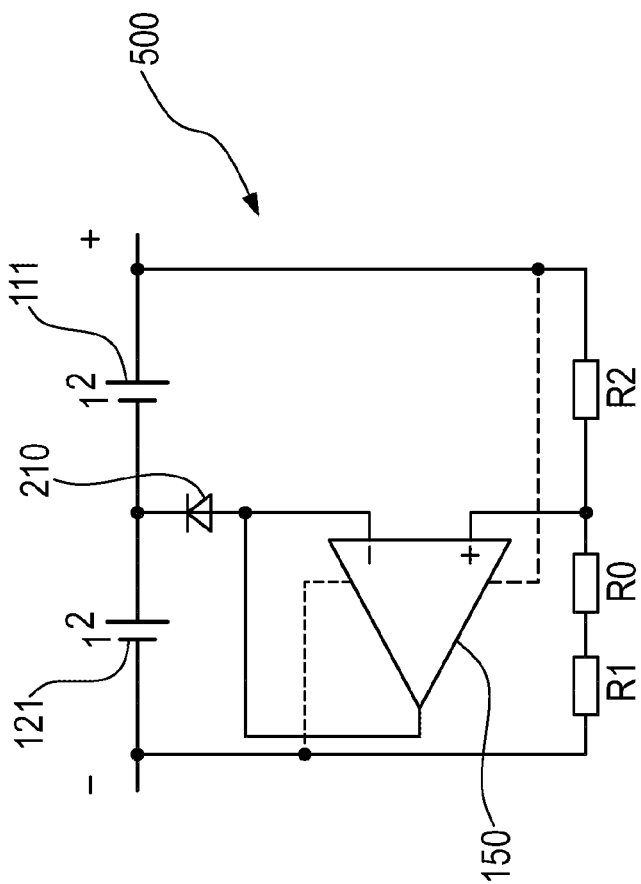
FIG. 5 shows a fifth embodiment of the rechargeable battery assembly according to the invention comprising a differential amplifier interconnected as a voltage balancing unit by way of a voltage follower circuit.

FIG. 5 illustrates a fifth embodiment of the present invention. In this case, a differential amplifier 150 is interconnected such that it forms a voltage follower circuit for the voltage balancing. Once again a first rechargeable battery unit 111 and a second rechargeable battery unit 121 are connected in series. The output of the differential amplifier 150 is connected via a diode 210 to a point between the first, negative pole of the first rechargeable battery unit 111 and the second, positive pole of the second rechargeable battery unit 121. The non-inverting input of the differential amplifier 150 is connected via a first resistor R1 and a resistor R0 to the negative pole of the second rechargeable battery unit 121 and is coupled via a second resistor R2 to the positive pole of the first rechargeable battery unit 111. The inverting input of the differential amplifier 150 is connected to the output of the differential amplifier 150 and is thus likewise connected to the point between the first, negative pole of the first rechargeable battery unit 111 and the second, positive pole of the second rechargeable battery unit 121. This voltage follower circuit, on account of its interconnection, has a gain of 1. In this case, the voltages of the parallel voltage divider are impressed on the cells.

Figure 6:
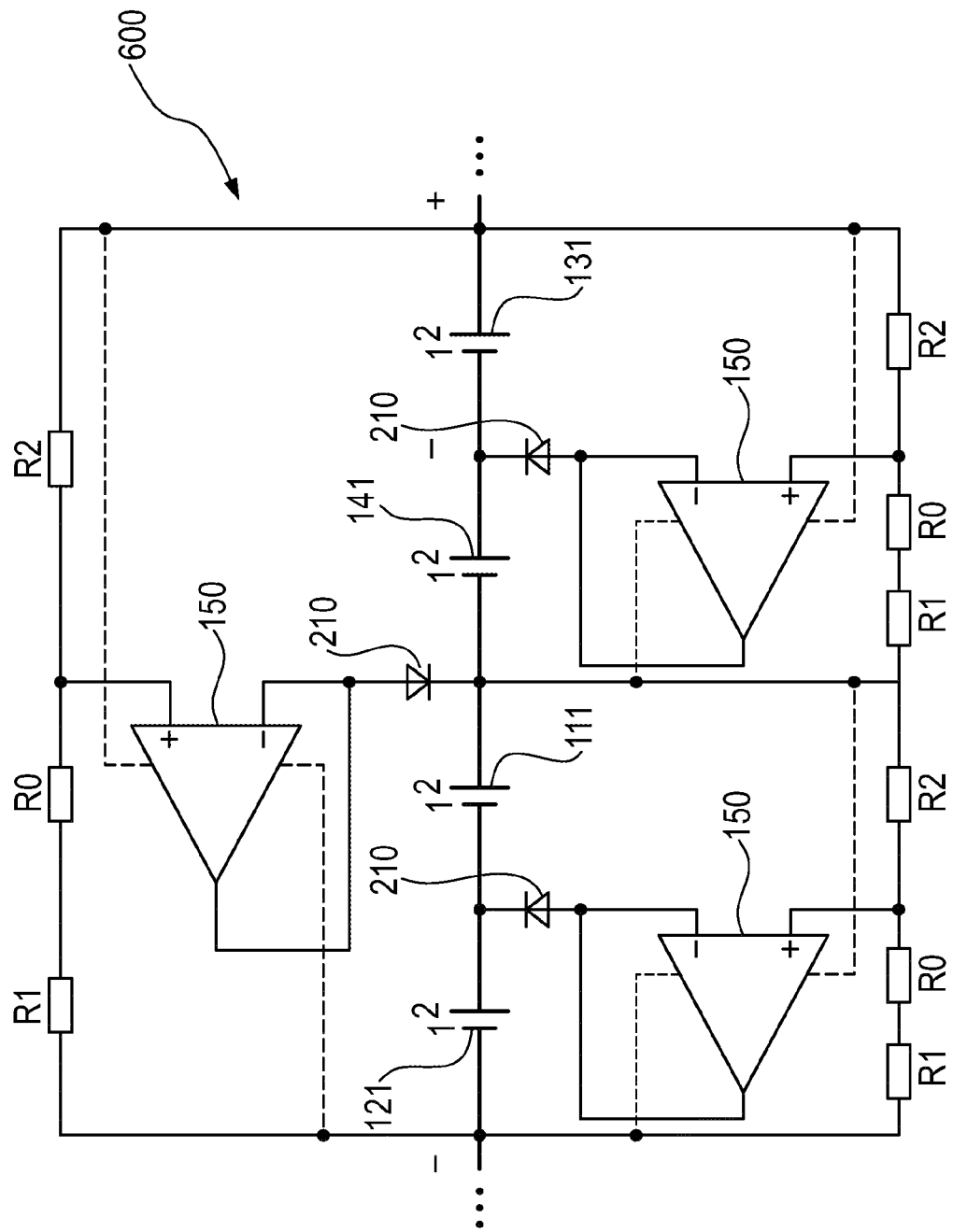
FIG. 6 shows a sixth embodiment of the rechargeable battery assembly according to the invention comprising a plurality of series-connected rechargeable battery units and differential amplifiers connected in a cascaded manner, which are interconnected in each case as a voltage balancing unit by way of a voltage follower circuit.

In accordance with the illustration in FIG. 6, analogously to the second and fourth embodiments, a plurality of differential amplifiers 150 can be provided in a rechargeable battery assembly 600 according to the invention and can be used in a cascade arrangement for a plurality of rechargeable battery units 111, 121, 131, 141. In the balancing circuit known from US 2005/0269989 A1, cited in the introduction, it is likewise possible to connect a diode downstream of the negative feedback of the differential amplifier or operational amplifier and to carry out an adaptation of the gain to the diode characteristic curve by way of an additional resistor R0. This basic circuit can be scaled—in accordance with US 2014/0035360 A1—in the manner illustrated in FIG. 6, such that blocks of two cells are respectively balanced by way of voltage dividers in the lower region by means of voltage follower circuits. In addition, a second voltage divider in the upper region likewise balances the two cell blocks overall by way of a voltage follower circuit.

It should be emphasized that the features of the invention described with reference to individual embodiments or variants, such as, for example, the type and configuration of the coupling element and of the individual resistors and the spatial arrangement thereof, may also be present in other embodiments, unless a different indication is given or this is precluded per se for technical reasons. Moreover, from such features, described in combination, of individual embodiments, all features need not necessarily always be realized in a relevant embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rechargeable battery assembly, comprising:
a first rechargeable battery unit having a first terminal and a second terminal;
a second rechargeable battery unit having a first terminal and a second terminal, said second rechargeable battery unit being connected in series with the first rechargeable battery unit; and
a differential amplifier having an inverting input, a non-inverting input and an output, at which an amplified difference between the signal at the inverting input and the signal at the non-inverting input is present, wherein
the non-inverting input of the differential amplifier is connected to the second terminal of the first rechargeable battery unit and to the first terminal of the second rechargeable battery unit,
the inverting input of the differential amplifier is coupled to the first terminal of the first rechargeable battery unit and to the second terminal of the second rechargeable battery unit,
the output of the differential amplifier is connected to the second terminal of the second rechargeable battery unit,
a coupling element having two load terminals is connected between the output of the differential amplifier and the second terminal of the second rechargeable battery unit, which coupling element enables the second rechargeable battery unit to be charged via the coupling element, but permits at most minimal discharging of the second rechargeable battery unit in a direction of the output of the differential amplifier,
the first terminal of the first rechargeable battery unit and a second terminal of a third rechargeable battery unit serve as a voltage supply or a reference for the differential amplifier,
the first terminal of the first rechargeable battery unit is connected to an input of the coupling element, and
a junction of the first rechargeable battery unit and the second rechargeable battery unit is directly connected to the non-inverting input of the differential amplifier.

2. The rechargeable battery assembly according to claim 1, wherein
the coupling element is a diode.

3. The rechargeable battery assembly according to claim 1, wherein
the coupling element is a transistor, which is controllable in a range such that the second rechargeable battery unit is not dischargeable at all, or is dischargeable to a defined minimal extent, in the direction toward the output of the differential amplifier.

4. The rechargeable battery assembly according to claim 1, wherein
a plurality of differential amplifiers are provided, which are connected in a cascaded manner.

5. An electric drive, comprising:
a rechargeable battery assembly according to claim 1, and
an electric machine connected to the rechargeable battery assembly.

6. A motor vehicle, comprising an electric drive according to claim 5.

* * * * *